United States Patent [19]
Bomar et al.

[11] Patent Number: 5,132,851
[45] Date of Patent: Jul. 21, 1992

[54] SIDE MIRROR ROTATING APPARATUS INCLUDING A TRANSDUCER WITH A SIGNAL TRANSMITTER AND A SIGNAL RECEIVER

[76] Inventors: Leslie A. Bomar, 600 Cherokee Dr.; Charles T. Rannells, 522 Cherokee Dr., both of New Albany, Ind. 47150

[21] Appl. No.: 578,335

[22] Filed: Sep. 6, 1990

Related U.S. Application Data

[63] Continuation-in-part of Ser. No. 275,671, Nov. 23, 1988, abandoned, which is a continuation of Ser. No. 38,625, Apr. 15, 1987, abandoned.

[51] Int. Cl.⁵ .......................... B60R 1/06; B60R 1/08; G02B 7/18
[52] U.S. Cl. ...................................................... 359/843
[58] Field of Search ............... 350/605, 637, 612, 606, 350/600

[56] References Cited

U.S. PATENT DOCUMENTS

| | | |
|---|---|---|
| 3,469,901 | 9/1969 | Cook et al. ............................ 350/605 |
| 3,527,528 | 9/1970 | McKee et al. ........................ 350/605 |
| 3,749,480 | 7/1973 | DeWitt et al. ........................ 350/605 |
| 3,950,080 | 4/1976 | McKee et al. ........................ 350/605 |
| 4,609,265 | 9/1986 | McKee et al. ........................ 350/605 |
| 5,056,905 | 10/1991 | Jensen ................................. 359/843 |

FOREIGN PATENT DOCUMENTS

| | | |
|---|---|---|
| 3527079 | 1/1986 | Fed. Rep. of Germany ...... 350/605 |
| 4243 | 1/1980 | Japan .................................. 350/605 |
| 87632 | 7/1980 | Japan .................................. 350/605 |
| 69273 | 12/1980 | Japan .................................. 350/605 |
| 41227 | 3/1982 | Japan .................................. 350/605 |
| 236849 | 11/1985 | Japan .................................. 350/605 |
| 116053 | 12/1986 | Japan .................................. 350/605 |

OTHER PUBLICATIONS

PCT WO86/05451, William J. Tate, Sep. 1986.

*Primary Examiner*—Jon W. Henry
*Attorney, Agent, or Firm*—Banner, Birch, McKie & Beckett

[57] ABSTRACT

An apparatus for automatically adjusting the angle of a side view mirror of a vehicle having a trailer coupled thereto is provided. The apparatus includes a control unit and at least one transducer coupled to the vehicle for transducing signals from the control unit to a signal directed toward the trailer and which is reflected back to the at least one transducer. The transducers are used to determine an angle between the vehicle and the trailer. A microchip then generates an electrical signal related to the angle between the vehicle and the trailer. A transmitter transmits the electrical signal using radio waves to a receiver unit disposed near the side view mirror. The receiver unit includes a receiving antenna for receiving the signal transmitted from the transmitter. A drive unit is electrically coupled to said receiver unit for rotating and adjusting the angle of the side view mirror in accordance with the electrical signal.

13 Claims, 12 Drawing Sheets

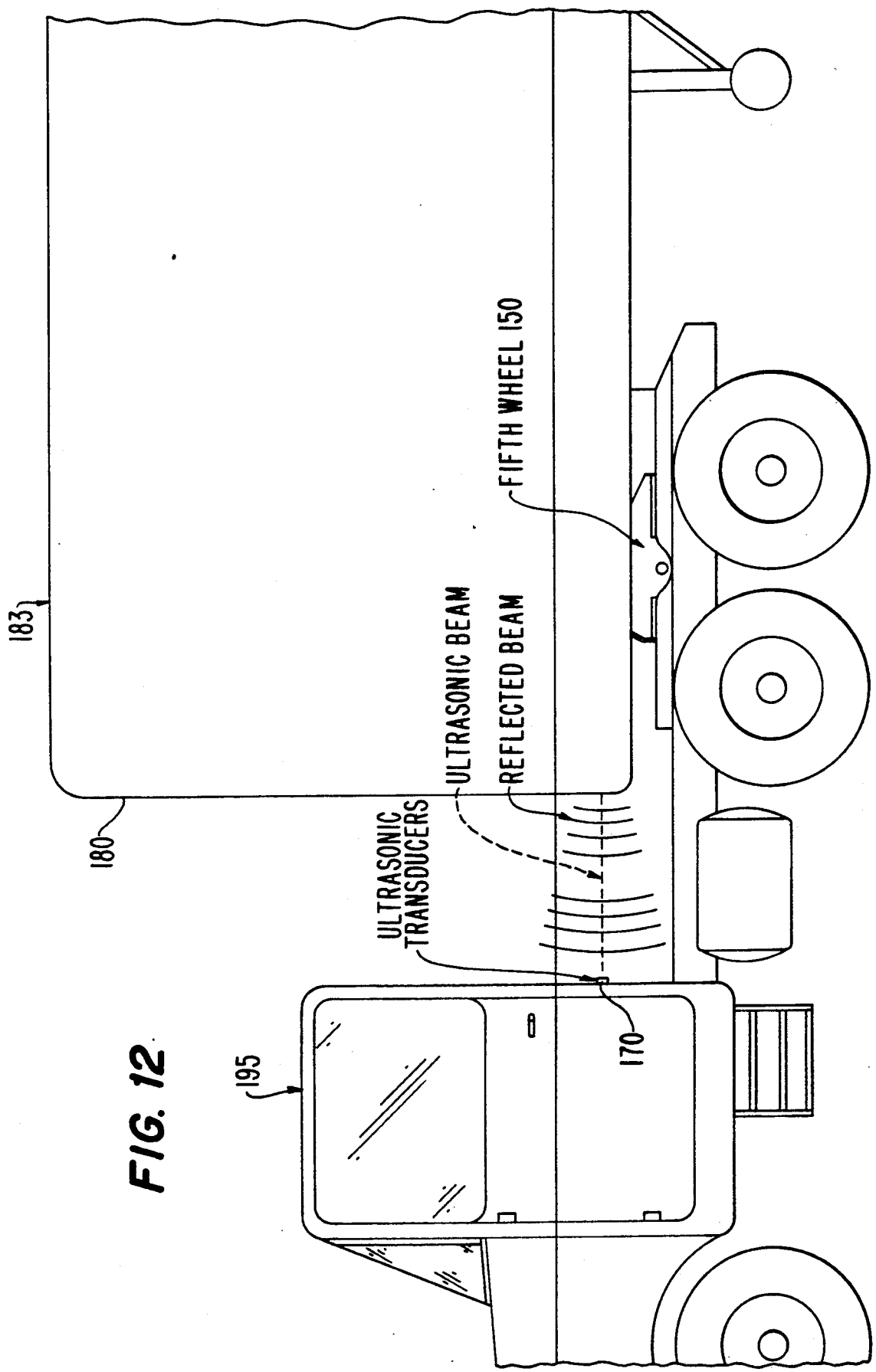

SIDE MIRROR ROTATING APPARATUS INCLUDING A TRANSDUCER WITH A SIGNAL TRANSMITTER AND A SIGNAL RECEIVER

RELATED APPLICATIONS

The present application is a continuation-in-part application of application Ser. No. 07/275,671 filed Nov. 23, 1988, now abandoned, which was a continuation of application Ser. No. 07/038,625, filed Apr. 15, 1987, now abandoned.

TECHNICAL FIELD

The present invention relates to a side mirror rotating apparatus for side mirrors of motor vehicles. More particularly, the present invention relates to a side mirror rotating apparatus that rotates the side mirrors in proportion to the turning of the steering wheel of the motor vehicle. Alternatively, the side mirrors may be rotated in accordance with an angle between, for example, a tractor and a trailer.

BACKGROUND OF THE INVENTION

The maneuvering ability of articulated vehicles such as tractor-trailer combinations is often hampered by the difficulty in quickly and conveniently determining the location of the rear end of the trailer and in viewing the area behind the rear end of the trailer This is particularly so when the trailer is long and the tractor is turning toward the right. Typically, externally mounted side mirrors are placed on both sides of the tractor. These mirrors are rigidly positioned for straight ahead driving. Therefore, during turns, one mirror provides a view of the side of the trailer while the other mirror provides a view of the area to the side of the trailer. Neither of these views are useful. The much needed view of the rear of the trailer is not provided.

Although the driver can view the left rear end of the trailer and behind it by looking out the left window when the trailer is turning toward the left, the driver must turn his head and divert his attention away from the front of the vehicle. The driver's peripheral vision may not provide immediate perception of events occurring at the front of the vehicle. Moreover, the driver is unable to peer out the right window and view the right rear end of the trailer during a right turn. Stationary mirrors are also deficient when a tractor-trailer is backing into a loading or unloading area such as a dock during an attempt to park. In these situations, the tractor is almost always at an acute angle relative to the trailer to facilitate the docking maneuver. Stationary mirrors do not permit the rear of the trailer to be viewed during parking as the angle between the tractor and the trailer do not provide such a view. It is often necessary for the driver to leave the vehicle or to obtain the assistance of an additional person to perform the backing and parking maneuvers.

In view of these problems, numerous attempts have been made to provide a mirror which pivots or rotates to provide a view of the rear of a trailer during turns. Some of these prior art systems are disclosed in U.S. Pat. Nos. 2,988,957; 3,469,901; 3,527,528; 3,536,382; 3,749,480; 4,609,265; 4,632,525. Many of these devices require complex mechanical devices with or without complicated electric circuits to rotate the side mirrors. Many devices are operated based on the angle between the tractor and the trailer as measured at the fifth wheel of the tractor. Some devices are activated by the turn signal of the vehicle. Further, many of these systems include components which are mounted on both the tractor and the trailer. This requires that system components be removed and remounted each time a tractor is coupled to a different trailer. Finally, the known devices are generally very complicated.

SUMMARY OF THE INVENTION

Accordingly, it an object of the present invention to provide a mirror rotating apparatus for a tractor-trailer whose components are mounted entirely on the tractor.

It is another object of the present invention to provide a mirror rotating apparatus activated by a steering wheel that is simple in construction and relatively inexpensive.

It is another object of the present invention to provide a mirror rotating apparatus that operates using an independent circuit of existing D.C. current from the vehicle.

It is another object of the present invention to provide a mirror rotating apparatus which may be installed, replaced, and transferred to other vehicles within a few hours using common tools.

It is another object of the present invention to provide a mirror rotating apparatus having a control unit that is mounted on the inside of the tractor and is well protected from weather and shock.

An apparatus for automatically adjusting the angle of a side view mirror of a vehicle in proportion to the turning of the steering wheel includes a control unit having a contact with the steering wheel of the vehicle. The control unit includes a device, which may be either electrical or mechanical, for translating the rotation of the steering wheel into an electrical signal. The electrical signal is transmitted to a receiver unit which is disposed near the side mirror and receives the electrical signal from the control unit. A drive unit is electrically connected to the receiver unit and is mounted on the mirror frame for rotating and adjusting the angle of the side mirror. The electrical signal of the control unit may be transmitted to the receiver unit either by an electrical connection or through the use of radio waves. In one alternate embodiment, the apparatus is designed to run on a lower voltage than that provided by the existing electrical system of the vehicle and therefore voltage dropping means such as a resistor or a zener diode is provided as part of the apparatus.

In accordance with another embodiment of the present invention, an apparatus for automatically adjusting the angle of a side view mirror of a vehicle having a trailer coupled thereto is provided. The apparatus includes a control unit and at least one transducer coupled to the vehicle for transducing signals from the control unit to a signal directed toward the trailer and which is reflected back to the at least one transducer. The transducers are used to determine an angle between the vehicle and the trailer. A microchip then generates an electrical signal related to the angle between the vehicle and the trailer. A transmitter transmits the electrical signal using radio waves to a receiver unit disposed near the side view mirror. The receiver unit includes a receiving antenna for receiving the signal transmitted from the transmitter. A drive unit is electrically coupled to the receiver unit for rotating and adjusting the angle of the side view mirror in accordance with the electrical signal.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 12 is a side view of a tractor-trailer utilizing the control unit of FIG. 9.

DETAILED DESCRIPTION OF PREFERRED EMBODIMENTS

Figure 1:
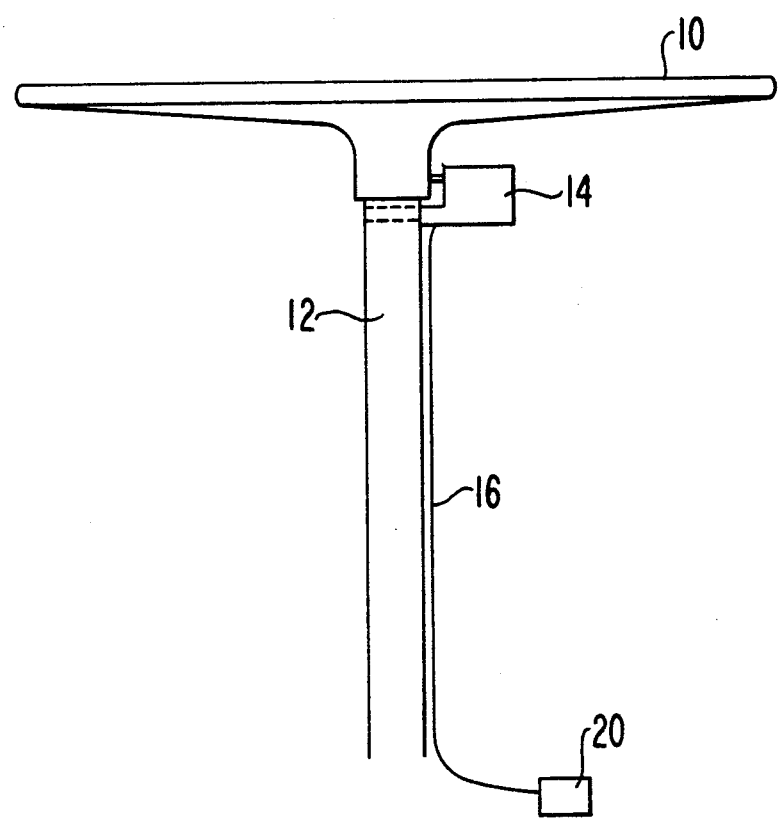
FIG. 1 is a side view of a steering wheel having a control unit portion of the device of the present invention attached thereto.
Figure 2:
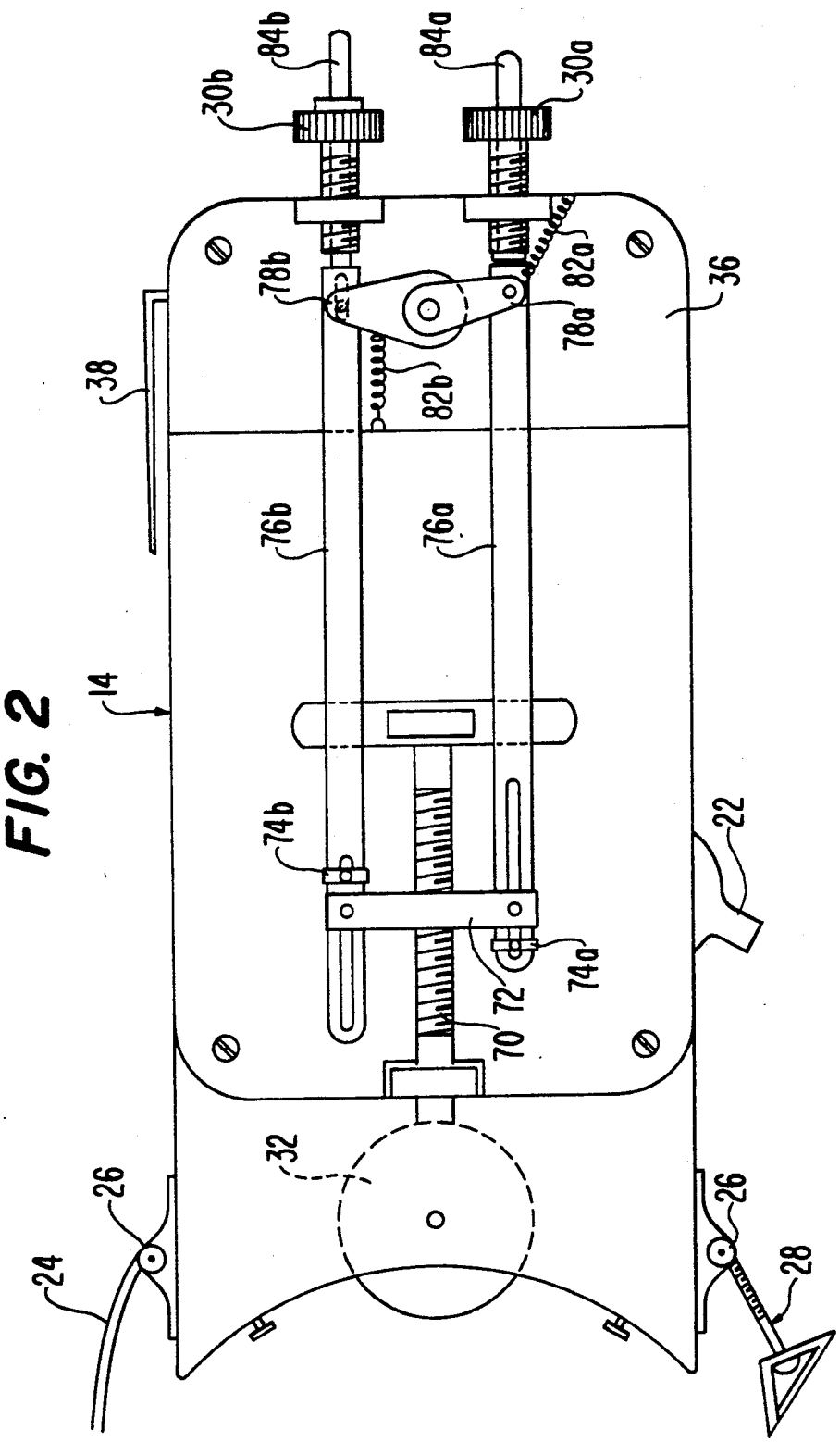
FIG. 2 is a top view of one embodiment of the control unit of FIG. 1 showing a mechanical system of translating steering wheel rotation into an electrical signal.

As shown in FIG. 1, steering wheel 10 of a vehicle is mounted on steering column 12. Control unit 14 of the mirror rotating apparatus is mounted on steering column 12 to contact a collar portion of steering wheel 10. Control unit 14 is connected by feed wire 16 to a main power source 20 through power switch 22 (FIG. 2). Power source 20 may be the electrical system of the vehicle.

Figure 3:
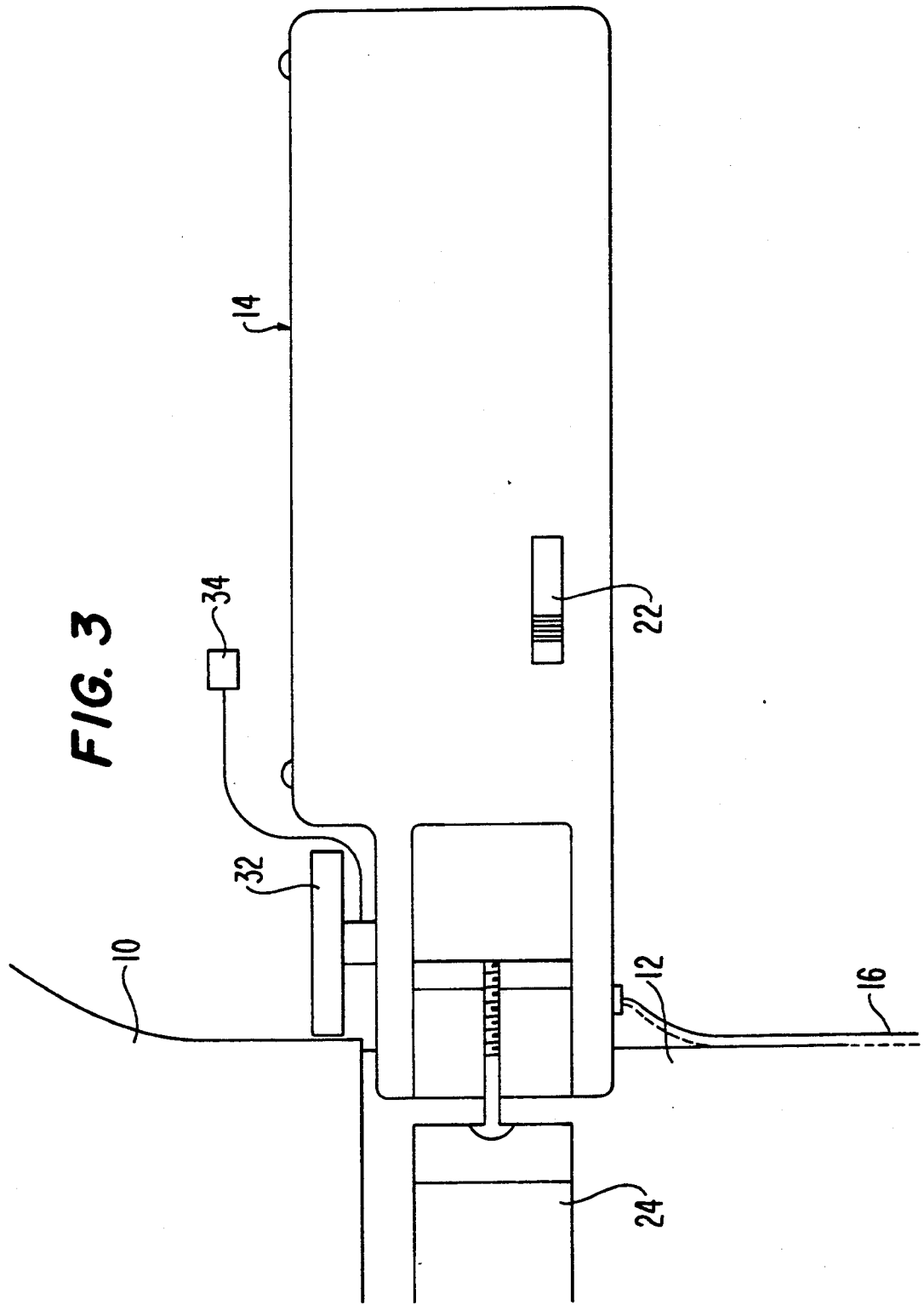
FIG. 3 is a side view of the control unit of FIG. 2 without the mechanical system.

As better shown in FIGS. 2 and 3, control unit 14 is held on steering column 12 by mounting strap 24 and fasteners 26. Adjusting screw 28 finely adjusts the position of control unit 14 on steering column 12. Control unit 14 includes manual aligning knobs 30 which adjust the neutral or straight ahead position of a mirror to accommodate any driver. Pickup wheel 32 is mounted on control unit 14 and is placed in rolling contact with steering wheel 10 as best shown in FIG. 3. Steering wheels also commonly have the configuration shown in FIG. 4. In an alternate embodiment, to best contact such a steering wheel 10, pickup wheel 32 has the configuration shown in FIG. 4. Control unit 14 may include a gear device 34, as shown in FIG. 3, to maintain the rotational motion of pickup wheel 32 within a particular range required by a specific installation.

Figure 5:
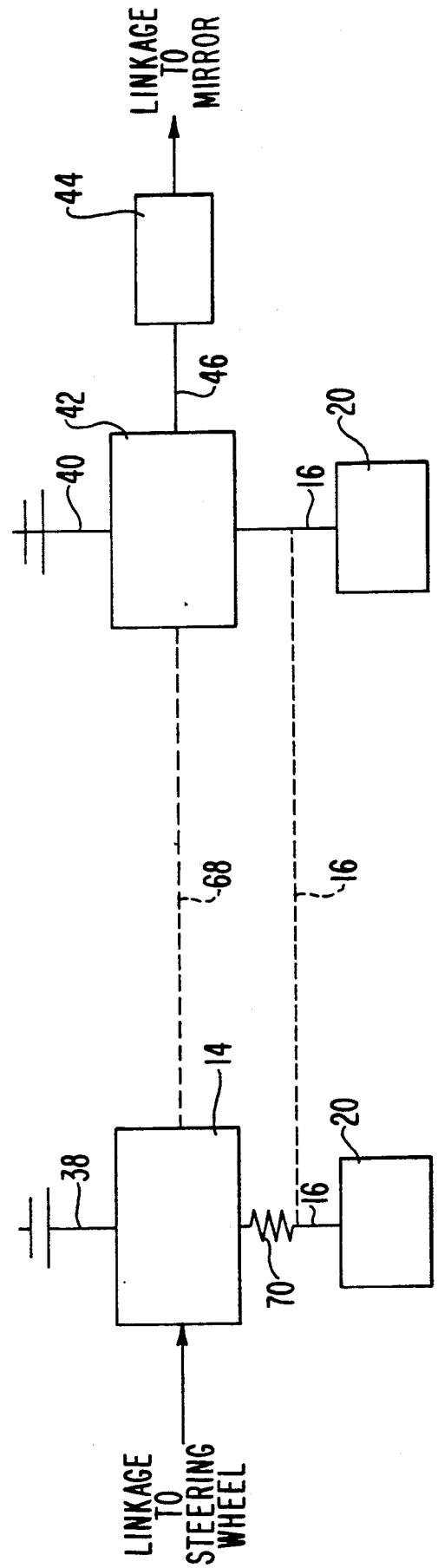
FIG. 5 is a schematic view of the system according to the present invention.

Control unit 14 also includes radio transmitter unit 36 which converts the rotational motion of pickup wheel 32 to an electrical signal. The signal is transmitted by antenna 38 to antenna 40 which is coupled to radio receiver unit 42, as shown in FIG. 5. Drive unit 44 is coupled to receiver unit 42 by drive unit control wire 46 and is driven by receiver unit 42 in accordance with the signal transmitted from transmitter unit 36.

Transmitter unit 36, receiver unit 42, and drive unit 44 can be of the type presently known in the art which are used for radio controlled model airplanes, cars and boats. Such units are available from a number of manufacturers and suppliers, such as those which advertise in R/C Modeler Magazine and other such publications. Control systems of this type usually have at least one channel which can convey control signal information using digital proportional techniques well known in the prior art.

In a one-channel system, the transmitter has a movable control knob which can be moved in a linear or circular motion. The transmitter converts the motion of the control knob to a digitally encoded signal which corresponds to the relative position of the control knob. The encoded signal is transmitted to the receiver which decodes and converts the signal to a signal which can be used to drive a servomotor (drive unit) so the relative movement of the servomotor matches the relative movement of the control knob on the transmitter.

In the present invention, pickup wheel 32 replaces the control knob on the conventional transmitter discussed above. In installations where pickup wheel 32 does not provide the correct range of rotation for the transmitter, gear device 34 may be used to adjust the rotational motion of the pickup wheel to meet the requirements of the transmitter, i.e., the rotational motion of the pickup wheel may be increased or decreased. Gear device 34 may also aid in translating the movement of pickup wheel 32 into an electrical signal. In addition, gear device 34 may be used to assist drive unit 44 in positioning the mirror in the desired manner when steering wheel 10 is turned. Alternatively, gear device 34 may be coupled to drive unit 44 in order to achieve the proper positioning of the mirror. Morevoer, transmitter unit 36 and/or receiver unit 42 may be electronically adjusted to provide the proper rotational movement of drive unit 44 when steering wheel 10 is turned.

Figure 4:
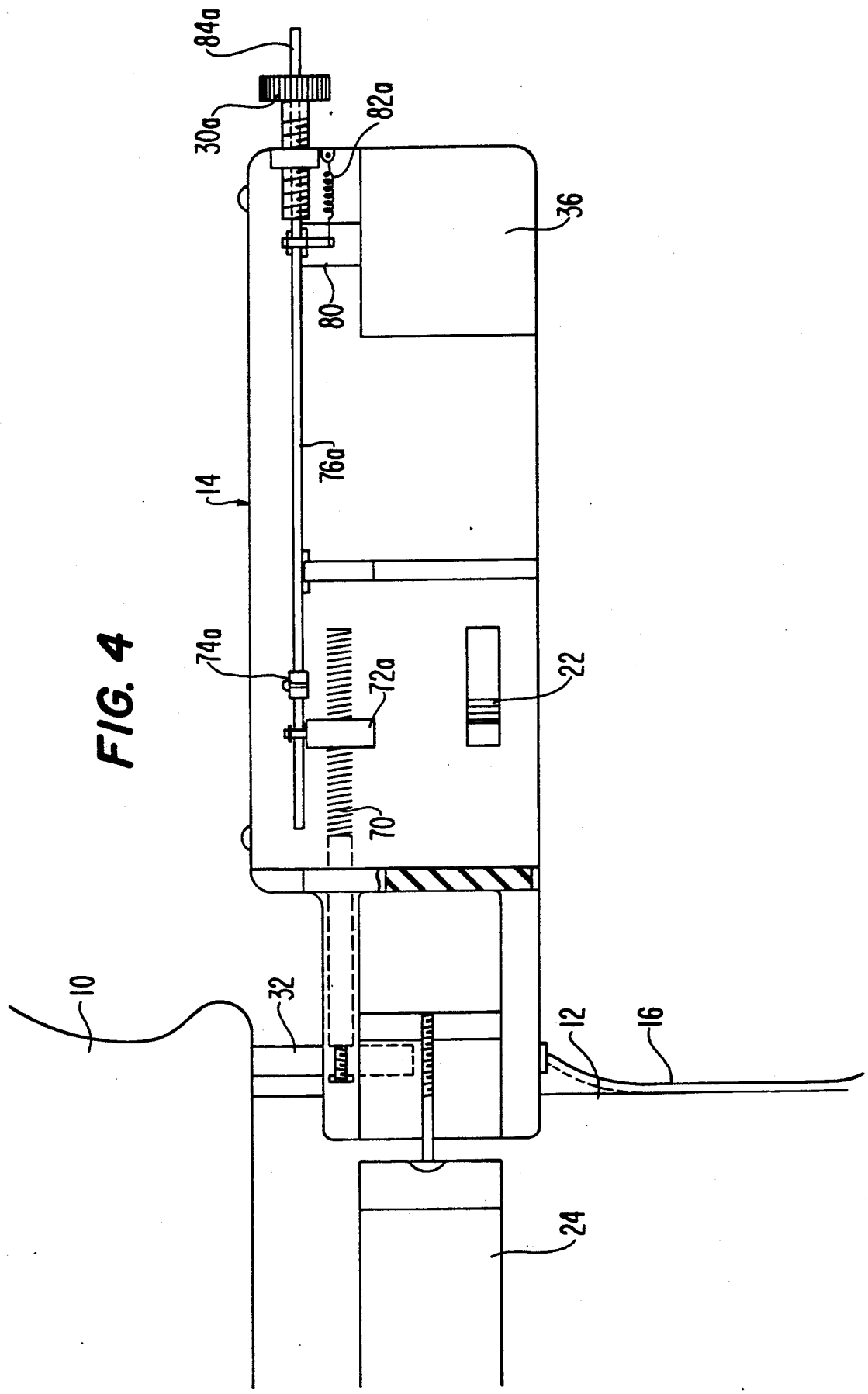
FIG. 4 is a side view of the control unit of FIG. 2 showing an alternate embodiment of the steering wheel-pickup wheel connection.

FIGS. 2 and 4 illustrate one embodiment of a mechanical method of translating the rotation of pickup wheel 32 to an electric or radio signal in transmitter unit 36. In this embodiment, the left mirror only rotates during left turns and the right mirror only rotates during right turns. Pickup wheel 32 is connected to threaded drive axle 70 so that clockwise rotation of pickup wheel 32 causes threaded drive axle 70 to rotate clockwise. This advances traveling bracket 72 to the left in the figures to contact adjustable lock 74a mounted on linkage arm 76a. The position of adjustable locks 74 on linkage arms 76 determines the null zone of operation for the device in which minor movements of steering wheel 10 do not rotate mirrors 52. This rotates linkage arm 78a which, through spindle 80, provides the signal for transmitter unit 36. This rotates one mirror only, for example, the left mirror. Rotation of pickup wheel 32 in the counterclockwise direction moves traveling bracket 72 to the right to contact adjustable lock 74b on linkage arm 76b. This rotates linkage arm 78b and rotates the right mirror through transmitter unit 36. Return springs 82 aid linkage arms 78 in returning mirrors 52 to their straight ahead position, which is manually adjusted using knobs 30a and 30b for the left and right mirrors, respectively. Translational motion of rods 84a and 84b manually rotate the left and right mirrors, respectively.

Figure 6:
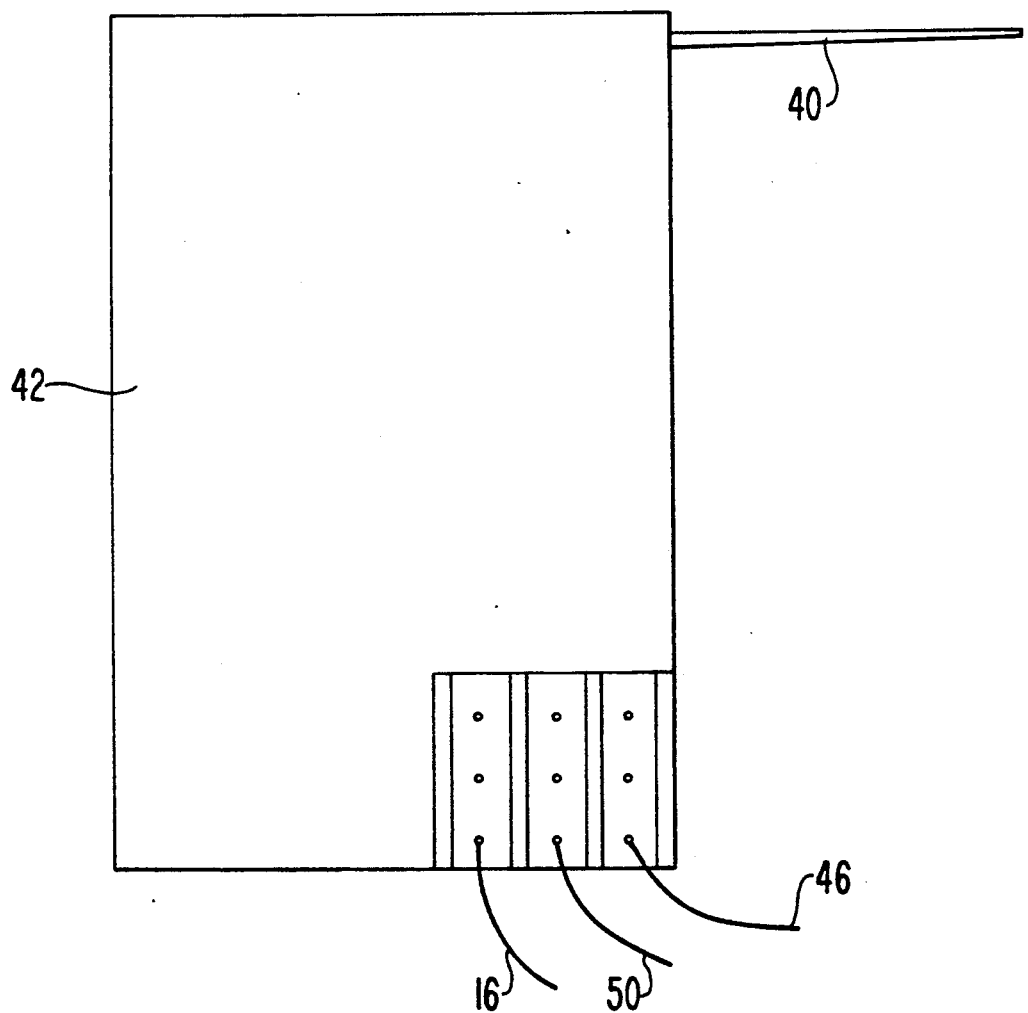
FIG. 6 shows a receiver unit.

FIG. 6 illustrates a digital proportional receiver of the type described above which may be used for receiver unit 42. Receiver 42 includes receiving antenna 40 for receiving the signal transmitted from transmitter unit 36, electrical feed wire 16 which provides electrical power to receiver unit 42 from power source 20, and drive unit control line 46 which controls the operation of drive unit 44. A second drive unit control wire 50 is shown for controlling operation of a second drive unit of a mirror located on the side of the truck opposite mirror 52.

Figure 7:
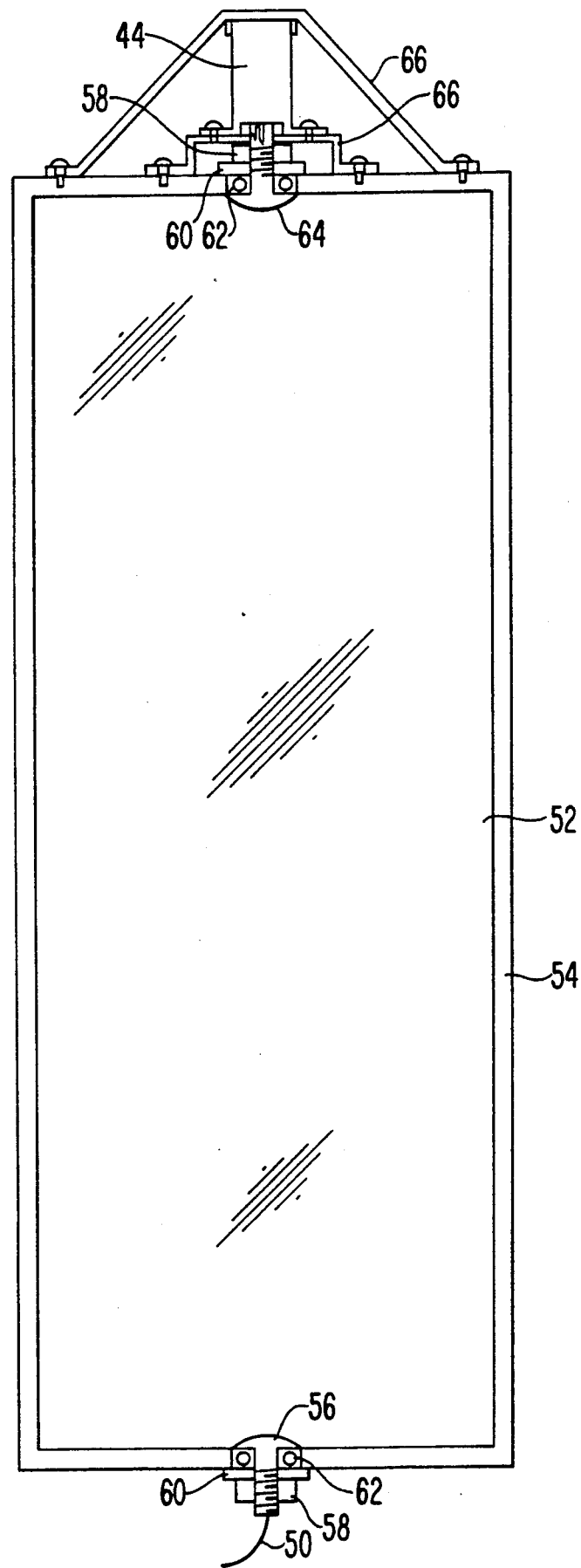
FIG. 7 shows a mirror having a drive unit.
Figure 8:
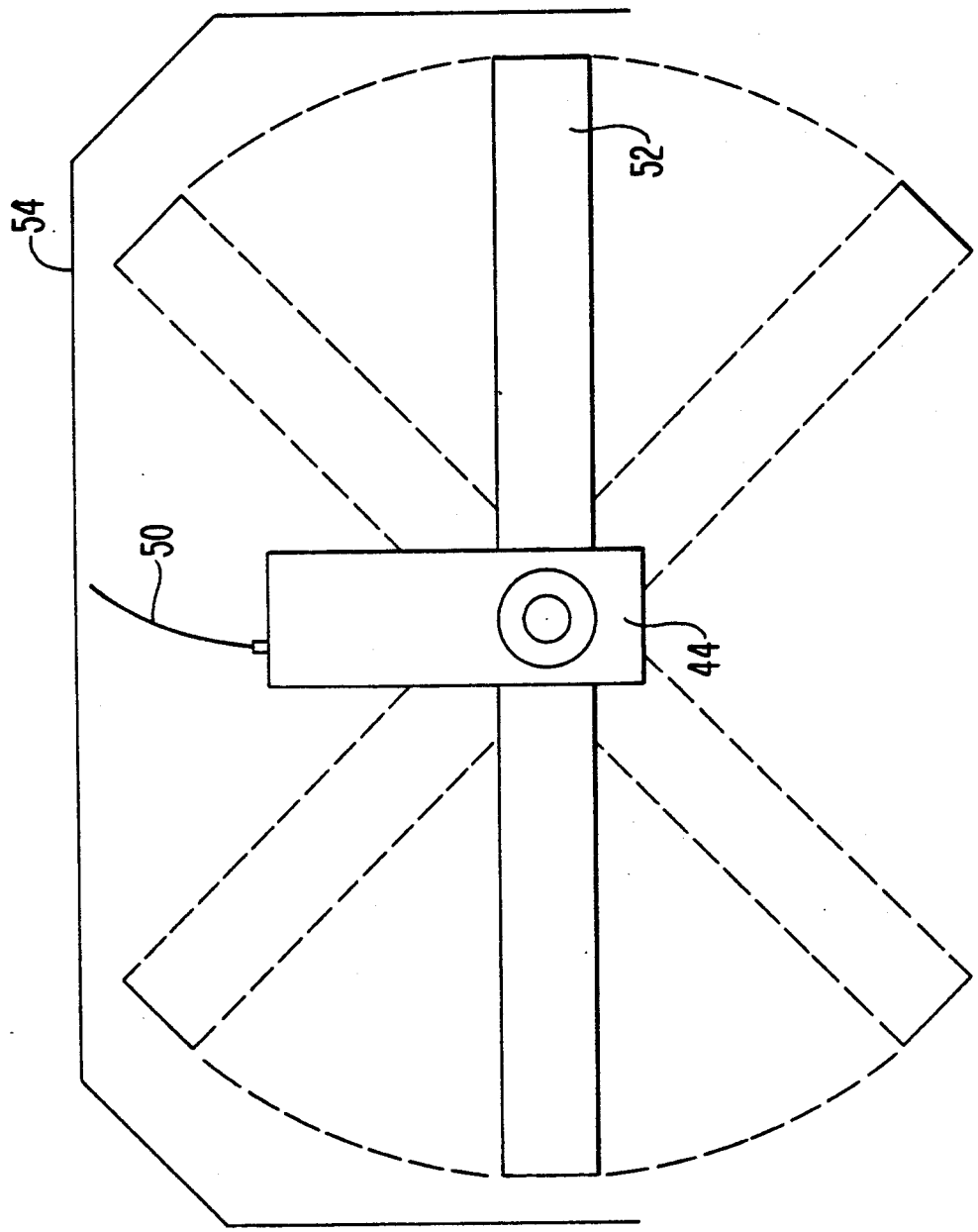
FIG. 8 shows a top view of the mirror of FIG. 7 illustrating the range of movement for the mirror.

FIG. 7 shows mirror 52 and its respective drive unit 44. Mirror 52 is mounted in mirror housing 54 at its lower end by bottom mirror axle 56, retaining nut 58, washer 60, and greased seal bearing 62. At its upper end mirror 52 is mounted in mirror housing 54 by top mirror drive axle 64, retaining nut 58, washer 60, and greased seal bearing 62. Drive unit 44 is mounted on top mirror drive axle 64 by mounting brackets 66 and controls the rotation of mirror 52. Mirror 52 rotates on bottom mirror axle 56 and top mirror drive axle 64. FIG. 8 illustrates the range of motion of mirror 52 within mirror housing 54.

In operation, as steering wheel 10 rotates in order to turn the vehicle, pickup wheel 32 of control unit 14 rotates. Control unit 14 uses gear device 34 where necessary to translate the rotation of steering wheel 10 into a rotation range for mirror 52. Transmitter unit 36 of control unit 14 sends a signal from transmitting antenna 38 to receiving antenna 40 of receiver unit 42. Using this signal, receiver unit 42 activates drive unit 44 which rotates mirror 52 the proper amount to view the rear of the vehicle. After the turn is complete, the steering wheel is returned to a position permitting the vehicle to drive straight thereby returning the mirror to its initial straight-viewing position. Control unit 14 is provided with a null zone of operation. That is, minor movements of the steering wheel to effectuate lane changes and nominal steering corrections will not rotate the mirrors. Only after the steering wheel has rotated a certain set minimum amount, as determined for example by the positioning of adjustable locks 74 on linkage arms 76, will control unit 14 begin rotating mirrors 52. This null zone may be accomplished electrically in control unit 14 or mechanically in either control unit 14, as shown in FIGS. 2 and 4, or in drive unit 52. If the automatic rotating function is not desired in some situations the apparatus may be turned off by power switch 22.

The above-described apparatus may be mounted in the factory or it may be mounted on existing trucks in a few hours using common tools. The device may therefore be easily transferred from vehicle to vehicle. The rotating mirror may be mounted in existing mirror brackets.

Alternatively, the signal from control unit 14 may be transmitted to receiver unit 42 through an electrical connection 68, shown in dotted line in FIG. 5. Feed wire 16 which powers receiver unit 42 may be routed through control unit 14, as shown in dotted line in FIG. 5; so that when power to control unit 14 is turned off by power switch 22, power to receiver unit 42 is also turned off. If it is desired to operate the apparatus on a voltage lower than that supplied by the vehicle, a voltage lowering device such as resistor 70 or a zener diode may be placed between the power source and control unit 14. Alternatively, the apparatus may be powered by an independent power source (not shown).

The apparatus of the present invention may be set up so that when the steering wheel is turned in one direction both mirrors turn in which case, for example, in turning left, the left mirror rotates to enable viewing the rear of the vehicle while the right mirror rotates in the same direction providing no additional assistance; or the apparatus may be set up so that during a left turn only the left mirror rotates and during a right turn only the right mirror rotates. In the latter configuration, control unit 14 also functions to operate the proper mirror, depending on which side of the straight ahead portion the steering wheel is. In either configuration, only the mirror on the side of the vehicle toward the turn is being used. Therefore, whether the other mirror rotates is of no consequence.

Figure 9:
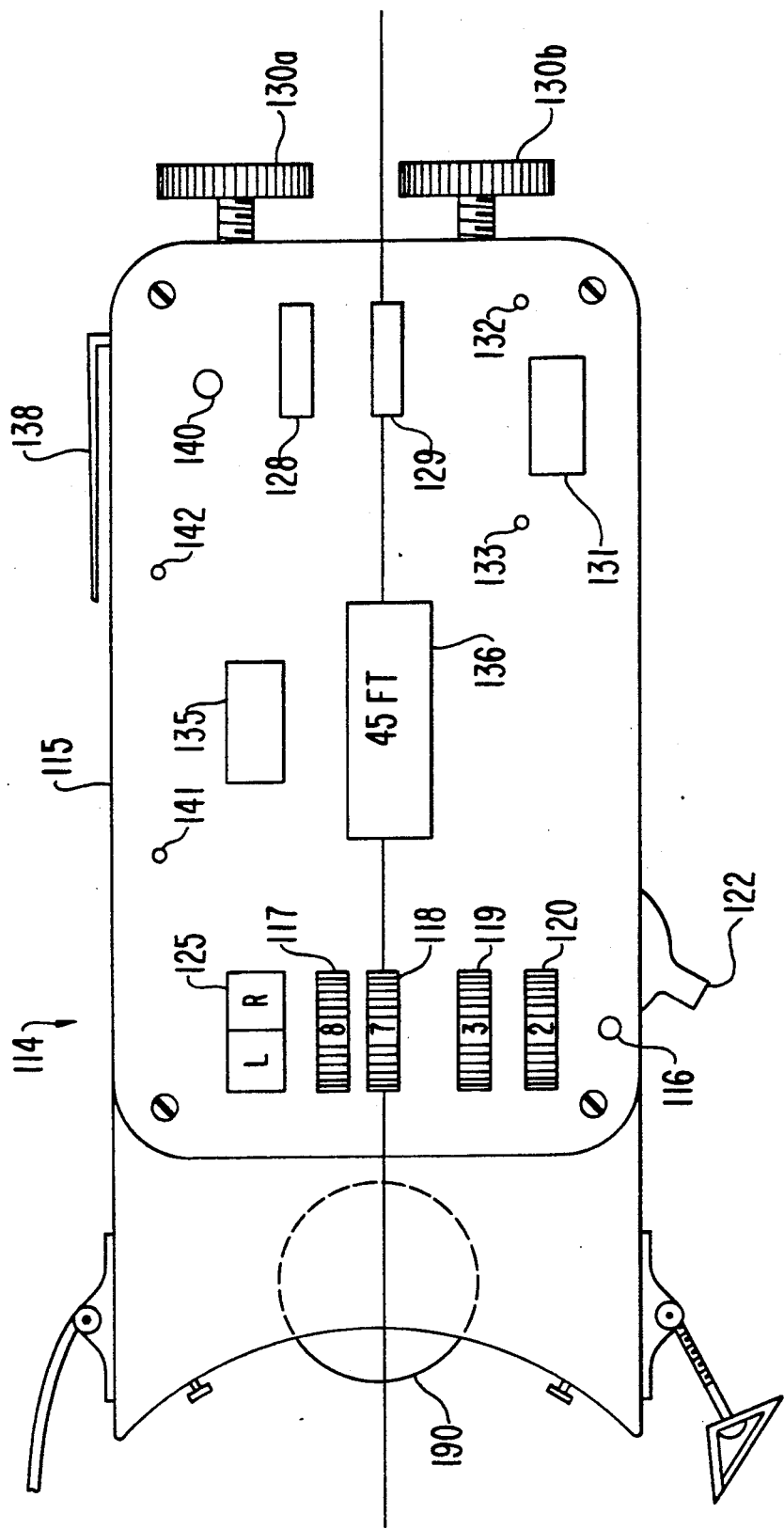
FIG. 9 is a top view of another embodiment of the control unit.

A second embodiment of the invention will be described with reference to FIGS. 9-12. The second embodiment essentially retains the features of the control unit of the first embodiment, but further utilizes at least two transducers mounted on a tractor and a microchip for controlling the control unit. FIG. 9 is a top view of the control unit of the second embodiment. Control unit 114 includes an outer housing 115 made of aluminum or a heavy grade durable plastic. The housing material should be chosen to minimize interference with the transmitted radio signals from the control unit to the receiver. Control unit 114 is mounted on a steering column in the same manner as described with respect to the first embodiment. Manual master ON/OFF power switch 122 controls the application of power from a power source to the unit. When in the ON position, power is coupled from a power source to the control unit. The power source may comprise, for example, the electrical system of the car or a separate battery. Master switch ON signal 116 is illuminated when power switch 122 is ON. In the OFF position, one or both mirrors remain or return to a neutral position for straight ahead driving. Rotatable dials 117 and 118 are utilized to respectively set the distance in feet and inches from the fifth wheel 150 of tractor 195 to the left side mirror 160 (see FIGS. 10-12). Similarly, rotatable dials 119 and 120 are used to respectively set the distance in feet and inches from the driver to the left side mirror 160. The distance from the driver to the right side mirror is preferably set in the memory of the microchip at the factory. This distance is fairly uniform (approximately eight feet) over the range of tractor widths and thus may be set at the factory. It will be apparent that this distance may alternatively be set by the user as with the other distances, if desired. It will further be apparent that the distances may be entered in many different ways, such as through the use of an LCD, and the invention is not limited in this respect.

Rocker switch 125 is used to establish the right and left null zones, i.e., to establish a predetermined zone of angular rotation of the steering column within which mirror adjustment will not take place. As discussed above, the null zone prevents, for example, nominal steering corrections from effecting rotation of the mirrors. Left mirror and right mirror adjustment knobs 130a and 130b are utilized to adjust the respective mirrors to determine a desired (neutral) field of view, e.g., the rear of the trailer or trailers being pulled. Pushbuttons 128 and 129 are respective manual override buttons for the left and right mirrors. Actuation of these buttons permits a driver to sweep through a predetermined angular range to view an area either before moving the vehicle or while the vehicle is in motion. When the respective buttons are released, the mirrors return to a mirror position determined by the current relationship of the tractor and the trailer. Alternatively, the mirrors may return to a predetermined position such as the neutral position.

Pushbutton 131 is a two-position button for generating a signal indicative of vehicle movement. When pushbutton 131 is released or in an "up" position, a signal indicating that the vehicle is moving forward is generated. Conversely, when the pushbutton 131 is depressed or in a "down" position, a signal indicating that the truck is backing up or in reverse is generated. When pushbutton 131 is in the "down" position, indicator light 132 is illuminated, informing the driver that the mirrors will be controlled for a backing up or reverse motion as will be understood by those skilled in the art. Indicator light 133 is illuminated to indicate that the mirrors will be controlled for forward motion.

Pushbutton 135 is used to set the length of a trailer, i.e., the distance from the fifth wheel on the tractor to the center of the rear axles. LCD 136 provides a display of the trailer length which is currently set. Each actuation of pushbutton 135 increments the current trailer length by five feet within a range of fifteen to sixty-five feet. It will be apparent to those skilled in the art that various increment values and ranges may be utilized and the present invention is not limited in this respect.

Indicator light 140 is illuminated or blinks when the ultrasonic detectors 170 and 171 and the control unit measure a distance between the tractor and trailer which is greater than some predetermined distance, e.g., fifteen feet, to thereby determine that the tractor is not pulling a trailer. Indicator light 140 may be switched OFF in this instance by switching power switch 122 OFF to return the mirrors to their neutral position. Indicator lights 141 and 142 are illuminated when the respective right and left ultrasonic transducers are being operated. Transmitting antenna 138 transmits control signals to the mirror.

As noted above, control unit 114 includes a microchip, preferably an HC-11 available from Motorola. Other microchips which may be utilized include a Z-80 available from Zilog or an HD647180 from Hitachi. The microchip controls the operation of the mirror rotation system. The distances set by rotating dials 117-120 (i.e., the distance from the fifth wheel of the tractor to the left side mirror and the distance from the driver to the left side mirror) are stored in the memory of the microchip. The length of the trailer or trailers as determined by pushbutton 135 is also stored. This information, as well as a current angle between the tractor and the trailer, is used by the microchip to generate a signal which is transmitted by transmitting antenna 138 to a receiver unit such as that described above with respect to the first embodiment. The received signal is used to drive a drive unit for rotating the mirror.

Figure 10:
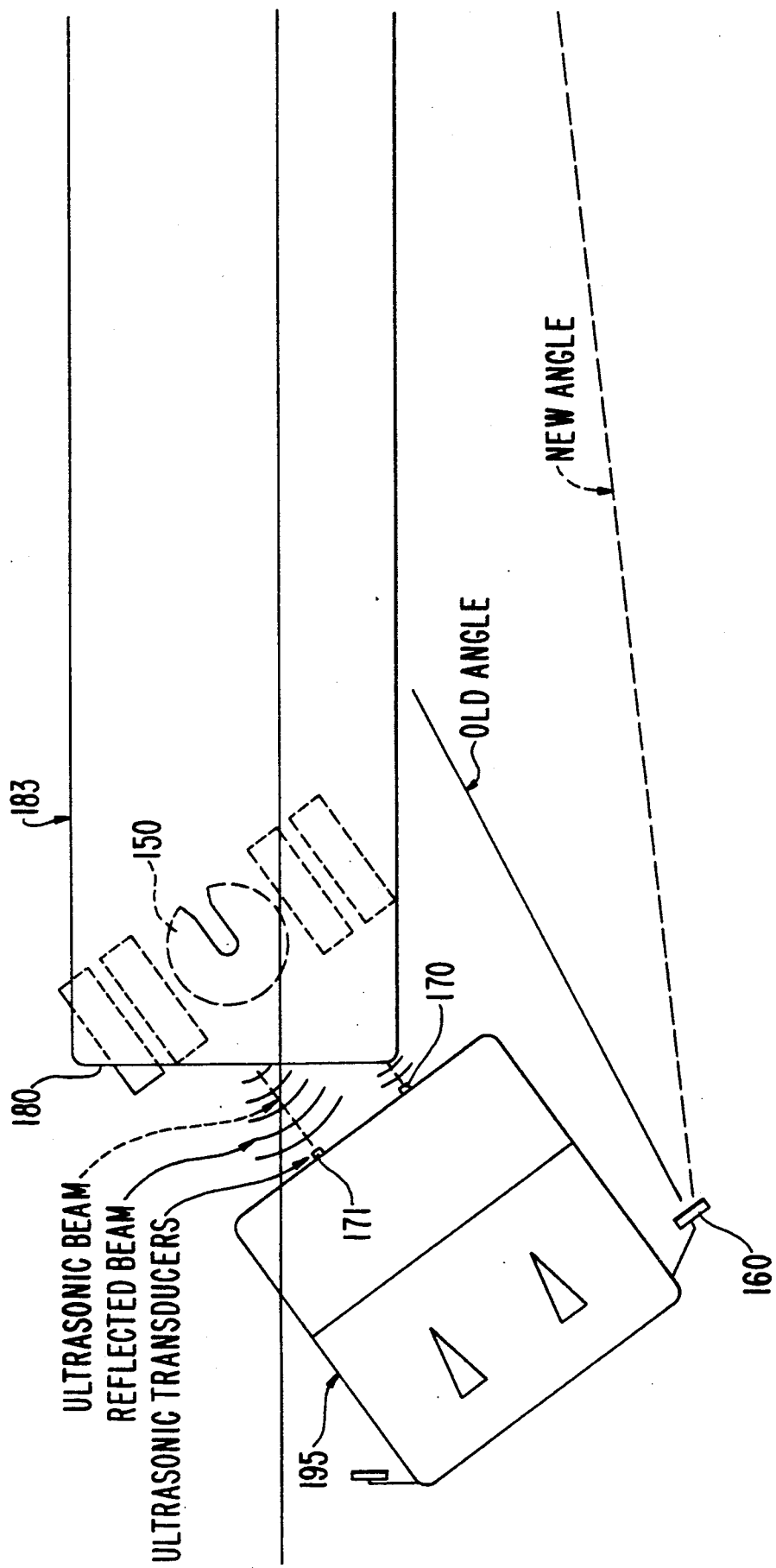
FIG. 10 is a first top view of a tractor-trailer utilizing the control unit of FIG. 9.
Figure 11:
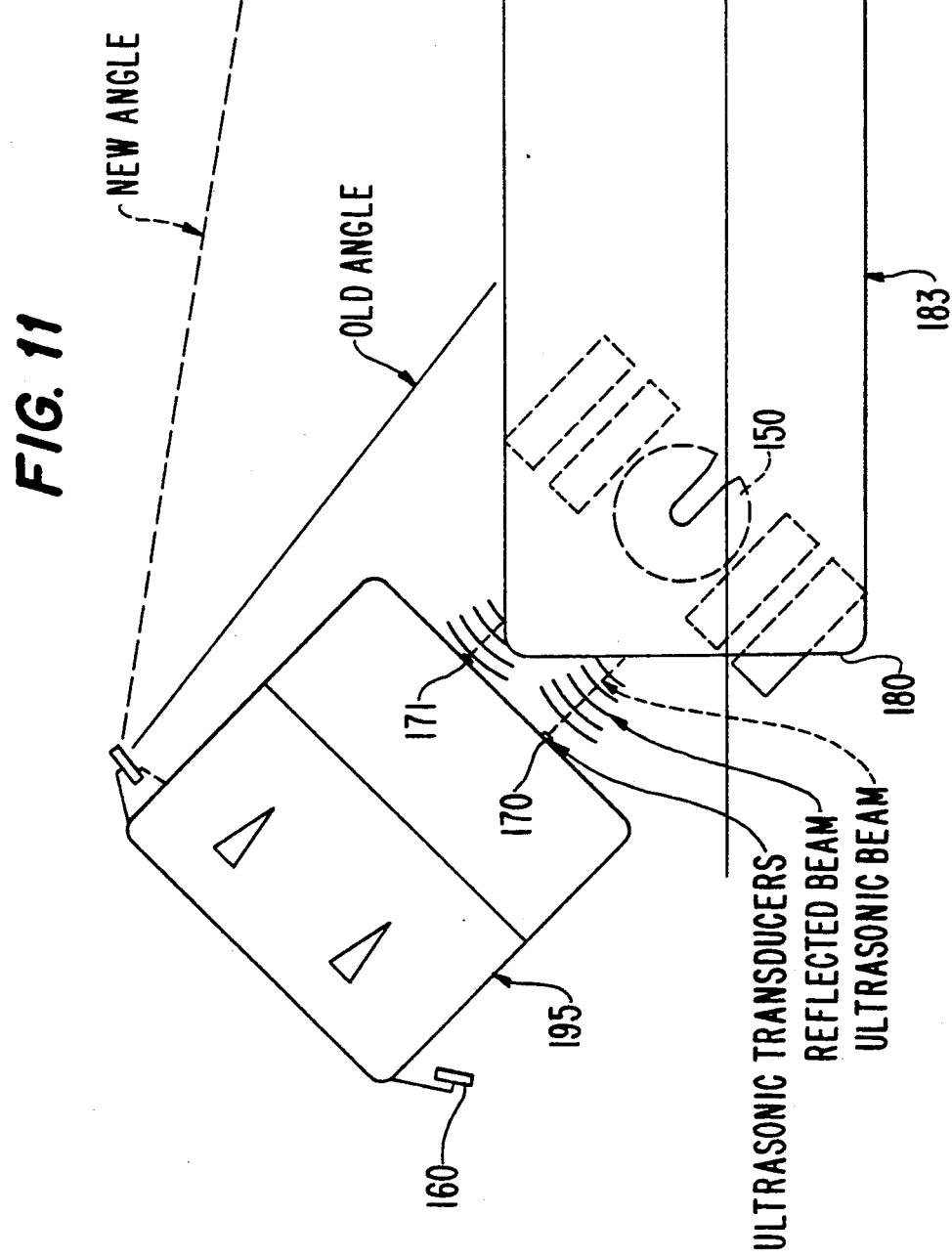
FIG. 11 is a second top view of a tractor-trailer utilizing the control unit of FIG. 9.

Transducers 170 and 171 are mounted on the rear portion of the tractor and are controlled by the microchip to determine an angle between the tractor and the trailer. The transducers may be surface mounted or recessed and may be either a narrow beam or a broad beam type. Preferably, there are two transducers mounted approximately four inches above a plane determined by the top of the fifth wheel 150 of the tractor as shown in FIG. 12. In general, transducers 170 and 171 should be mounted to ensure proper angular determination for all size trailers, including, for example, flatbeds. Mounting the transducers relatively close to the plane of the fifth wheel ensures that a given tractor can be utilized with many different types and sizes of trailers. The transducers are preferably aligned with the respective edges of the fifth wheel 150 as best shown in FIGS. 10 and 11, although the invention is not limited in this respect. Positioning transducers 170 and 171 as shown in FIGS. 10 and 11 allows ultrasonic sound waves generated and transmitted from the ultrasonic transducers 170 and 171 to strike the front of any trailer and be reflected back to the transducers. By measuring the time taken for the emitted ultrasonic sound waves to be reflected back to the transducers, the distance between the respective transducer and the trailer can be determined. Commercially available transducers such as those suitable for determining depth and used by, for example, fishermen may be utilized. Such transducers are manufactured, for example, by Polaroid.

The microchip is coupled to transducers 170 and 171 via hard wiring (not shown). When the steering column is rotated to an angle outside the null zone, the microchip activates the transducers via transducer control signals transmitted over the hard-wired connection. Potentiometer 190 which is coupled to the steering column provides a signal to the microchip when an angle outside the null zone is reached. These signals from the microchip are changed by the transducers into ultrasonic sound waves 220 having a speed of approximately 746 miles per hour. These sound waves strike a front portion 180 of trailer 183 and are reflected back toward the transducers as reflected waves 222 as shown in FIGS. 10-12. Based on the time it takes for the ultrasonic sound waves to be reflected back and detected by the transducers, the microchip calculates the distances between the respective transducers and the trailer. From this information and the information stored in memory, the microchip calculates the angle formed by the tractor and the trailer. Based on this calculated angle, the microchip generates a signal which is transmitted via antenna 138 to antenna 40 of radio receiver unit 42. This signal, as discussed above with respect to the first embodiment, generates a corresponding rotation of the mirror.

It is important to note that the present embodiment retains the simplicity achieved by the first embodiment. Significantly, the entire structure is mounted on tractor 195 and no portion of the system is mounted on trailer 183. This is important since it permits the system to be implemented simply by hooking up a different trailer and entering its length into the memory of the microchip. Nothing must be attached to or removed from the trailer, thereby promoting simplicity of use.

Control unit 144 is capable of handling any length of trailer or trailers. Once the system is initialized for a trailer as discussed below, operation of the mirror rotating apparatus is automatic until the trailer is dropped or a different length trailer is picked up. The present system enables correct adjustment of the mirror to new angles as they are generated and provides a driver with a constant view of the trailer's rear end.

The control unit includes the ability to follow the trailer through its full 180 degrees of operating range. In the event the ultrasonic transducers determine that no trailer is hooked up to the truck, the control unit automatically resets one or both mirrors to the neutral position. Any malfunction of the transducers or other components results in the control unit returning and holding the mirrors in the neutral position until the faulty part is repaired.

During the initial installation of the unit, power switch 122 is switched ON, thereby illuminating master switch ON light 116 to indicate that control unit 114 is on-line. Next, the steering axle wheels are straightened. "L" is then pushed on rocker switch 125 while the steering wheel of the tractor is turned to the left to establish and store the null zone measurement into microchip memory. This process is repeated to fix the right null zone. The left mirror adjustment knob 130a and the right mirror adjustment knob 130b are used to determine the neutral position. This information is also stored in the microchip memory. The microchip of control unit 114 is thus provided with the information necessary to operate mirror rotating apparatus in an automatic mode.

The microchip memory is loaded with information as described above. The remainder of the programming of the microchip is performed at the factory. Such programming includes instructions for controlling the ultrasonic transducers, determining the distances from the transducers to the trailer, and calculating the angle between the tractor and the trailer. Information is sent, received, processed, and relayed to the appropriate mirror for precise movement in a very short period of time. Transmission of the information to the mirrors is preferably by RF transmission as discussed above and will not be discussed in detail here.

The above described embodiment may be designed to control only the left mirror or may control both the left and right side mirror.

The United States patents and applications referenced above are hereby incorporated by reference into this application in their entirety.

Numerous characteristics and advantages of the invention have been described in detail in the foregoing description with reference to the accompanying drawings. However the disclosure is illustrative only and the invention is not limited to the precise illustrated embodiments. Various changes and modifications may be affected therein by one skilled in the art without departing from the scope or spirit of the invention.

We claim:

1. An apparatus for automatically adjusting the angle of a side view mirror of a vehicle having a trailer coupled thereto, said apparatus comprising:
   a control unit including a memory for storing dimension information of said vehicle and said trailer;
   at least one transducer responsive to said control unit and attached to said vehicle, each transducer including a signal transmitter for transmitting signals toward said trailer and a signal receiver for receiving signals reflected back to said transducer by said trailer;
   determining means coupled to said at least one transducer for determining an angle between said vehicle and said trailer in accordance with the dimension information stored in said memory and a time required for signals transmitted by said signal transmitter to be reflected back to said signal receiver;
   generating means responsive to said determining means for generating an electrical signal related to the angle between said vehicle and said trailer;
   transmitting means for transmitting the electrical signal using radio waves;
   a receiver unit disposed near the side view mirror, said receiver unit including a receiving antenna for receiving the signal transmitted from said transmitting means; and
   a drive unit electrically coupled to said receiver unit for rotating and adjusting the angle of the side view mirror in accordance with the electrical signal.

2. An automatically adjusting side view mirror for use with a vehicle, said automatically adjusting side view mirror comprising:
   a rotating mirror capable of rotating around a vertical axis;
   a control unit;
   at least one transducer responsive to said control unit and attached to said vehicle, each transducer including a signal transmitter for transmitting signals toward said trailer and a signal receiver for receiving signals reflected back to said transducer by said trailer;
   determining means coupled to said at least one transducer for determining an angle between said vehicle and said trailer in accordance with the dimension information stored in said memory and a time required for signals transmitted by said signal transmitter to be reflected back to said signal receiver;
   generating means responsive to said determining means for generating an electrical signal related to the angle between said vehicle and said trailer;
   transmitting means for transmitting the electrical signal using radio waves;
   a receiver unit disposed near the side view mirror, said receiver unit including a receiving antenna for receiving the signal transmitted from said transmitting means; and
   a drive unit electrically coupled to said receiver unit for rotating and adjusting the angle of the side view mirror in accordance with the electrical signal.

3. The apparatus according to claim 1 wherein said control unit comprises a control unit in contact with a steering column of said vehicle, said control unit generating transducer control signals for activating said at least one transducer when said steering column is rotated to an angle outside a null zone.

4. The apparatus according to claim 1 wherein said signal transmitter comprises a signal transmitter for transmitting ultrasonic sound waves.

5. The apparatus according to claim 1 wherein said control unit includes input means for inputting a length of said trailer, a distance from a fifth wheel of said vehicle to said side view mirror, and a distance from a driver of said vehicle to said side view mirror as dimension information.

6. The apparatus according to claim 2 wherein said control unit comprises a control unit in contact with a steering column of said vehicle, said control unit generating transducer control signals for activating said at least one transducer when said steering column is rotated to an angle outside a null zone.

7. The apparatus according to claim 2 wherein said signal transmitter comprises a signal transmitter for transmitting ultrasonic sound waves.

8. The apparatus according to claim 2 wherein said control unit includes input means for inputting a length of said trailer, a distance from a fifth wheel of said vehicle to said side view mirror, and a distance from a driver of said vehicle to said side view mirror as dimension information.

9. An apparatus for automatically adjusting the angle of a side view mirror of a vehicle having a trailer coupled thereto, said apparatus comprising:
   a control unit including a memory for storing dimension information of said vehicle and said trailer;
   at least one transducer responsive to said control unit and attached to said vehicle, each transducer including a signal transmitter for transmitting signals toward said trailer and a signal receiver for receiving signals reflected back to said transducer by said trailer;

determining means coupled to said at least one transducer for determining an angle between said vehicle and said trailer in accordance with the dimension information stored in said memory and a time required for signals transmitted by said signal transmitter to be reflected back to said signal receiver;

generating means responsive to said determining means for generating an electrical signal related to the angle between said vehicle and said trailer;

a transmitter for transmitting the electrical signal;

a receiver unit disposed near the side view mirror, said receiver unit including a receiver for receiving the signal transmitted from said transmitter; and a drive unit electrically coupled to said receiver unit for rotating and adjusting the angle of the side view mirror in accordance with the electrical signal.

10. The apparatus according to claim 9 wherein said control unit comprises a control unit in contact with a steering column of said vehicle, said control unit generating transducer control signals for activating said at least one transducer when said steering column is rotated to an angle outside a null zone.

11. The apparatus according to claim 9 wherein said transmitter comprises a transmitter for transmitting the electrical signal using radio waves and said receiver comprises an antenna for receiving the radio waves.

12. The apparatus according to claim 9 wherein said signal transmitter comprises a signal transmitter for transmitting ultrasonic sound waves.

13. The apparatus according to claim 9 wherein said control unit includes input means for inputting a length of said trailer, a distance from a fifth wheel of said vehicle to said side view mirror, and a distance from a driver of said vehicle to said side view mirror as dimension information.

* * * * *